(12) United States Patent
Yasuda

(10) Patent No.: US 10,738,889 B2
(45) Date of Patent: Aug. 11, 2020

(54) GASKET

(71) Applicant: Ishikawa Gasket Co., Ltd., Minato-ku, Tokyo (JP)

(72) Inventor: Kisho Yasuda, Tokyo (JP)

(73) Assignee: ISHIKAWA GASKET CO., LTD., Tokyo (JP)

( * ) Notice: Subject to any disclaimer, the term of this patent is extended or adjusted under 35 U.S.C. 154(b) by 160 days.

(21) Appl. No.: 15/955,826

(22) Filed: Apr. 18, 2018

(65) Prior Publication Data

US 2019/0323606 A1 Oct. 24, 2019

(51) Int. Cl.
*F16J 15/08* (2006.01)
*F01N 13/18* (2010.01)

(52) U.S. Cl.
CPC ....... *F16J 15/0825* (2013.01); *F01N 13/1827* (2013.01); *F16J 2015/085* (2013.01); *F16J 2015/0868* (2013.01)

(58) Field of Classification Search
CPC .............. F16J 15/0818; F16J 15/0825; F16J 2015/085; F16J 2015/0868; F01N 13/1827
See application file for complete search history.

(56) References Cited

U.S. PATENT DOCUMENTS

| | | | | |
|---|---|---|---|---|
| 5,360,219 A | * | 11/1994 | Okuda | F01N 13/1827 277/592 |
| 5,853,175 A | * | 12/1998 | Udagawa | F16J 15/0825 277/595 |
| 6,189,895 B1 | * | 2/2001 | Yamada | F02F 11/00 277/591 |
| 6,260,612 B1 | * | 7/2001 | Nakamura | F28D 9/0075 165/149 |
| 6,428,016 B1 | * | 8/2002 | Miyaoh | F16J 15/0818 277/591 |
| 7,669,859 B2 | * | 3/2010 | Imai | F02F 11/002 277/592 |
| 9,932,880 B2 | * | 4/2018 | Hutchins | F01P 3/02 |
| 2007/0164518 A1 | * | 7/2007 | Imai | F02F 11/002 277/594 |
| 2015/0345364 A1 | * | 12/2015 | Hutchins | F01P 3/02 123/41.08 |
| 2018/0340462 A1 | * | 11/2018 | Hideshima | F01N 13/1827 |

FOREIGN PATENT DOCUMENTS

JP 2001-289325 A 10/2001

* cited by examiner

*Primary Examiner* — Nicholas L Foster
(74) *Attorney, Agent, or Firm* — Manabu Kanesaka

(57) ABSTRACT

A gasket formed by laminating two or more metal plates includes a seal target hole, an annular seal portion sealing an outer peripheral edge of the seal target hole, and a plurality of bolt holes disposed at the outer peripheral side of the seal portion. Each metal plate constituting a thermal deformation coping portion is provided with slits intersecting in a longitudinal direction of the metal plate and each slit constitutes a lamination portion of the metal plate so as not to penetrate in a lamination direction. When one seal target hole is provided, a portion suspended in the seal target hole is formed at the thermal deformation coping portion, and when multiple seal target holes are provided, at least one of portions interposed between the adjacent seal portions and a portion interposed between the adjacent bolt holes is formed at the thermal deformation coping portion.

4 Claims, 8 Drawing Sheets

GASKET

BACKGROUND

Technical Field

The present invention relates to a gasket, and more particularly, to a gasket which prevents damage due to thermal expansion or thermal contraction.

Related Art

As a gasket which prevents deformation or damage due to thermal expansion or thermal contraction, there is proposed a gasket in which at least a part of a region of a fluid space adjacent to at least one metal plate among metal plates constituting a lamination gasket is removed (see JP 2001-289325A). In the gasket, apart of the metal plate in a region in which thermal expansion or thermal contraction easily occurs is removed to decrease the number of the laminated metal plates in this region, thereby preventing deformation or damage due to the thermal expansion or thermal contraction of the gasket.

SUMMARY

Incidentally, damage due to the thermal expansion or thermal contraction of the gasket becomes a factor causing a temperature difference in a usage environment and the thermal expansion or thermal contraction occurs in all metal plates constituting the gasket. Therefore, in the gasket, since there is no measure for the metal plate which is not removed in the region in which a part of the metal plates is removed, there is concern that the metal plate which is not removed may be damaged due to the thermal expansion or thermal contraction. The present invention has been made in view of the above-described circumstances and an object of the present invention is to provide a gasket capable of efficiently preventing damage due to thermal expansion or thermal contraction.

A gasket of the present invention for achieving the above-described object is formed by laminating two or more metal plates and includes at least one seal target hole penetrating in a lamination direction, an annular seal portion sealing an outer peripheral edge of the seal target hole, and a plurality of bolt holes disposed at the outer peripheral side of the seal portion so that fastening bolts are inserted therethrough, wherein as a thermal deformation coping portion, all metal plates constituting the thermal deformation coping portion are provided with slits intersecting in a longitudinal direction of the metal plate and these slits constitute a lamination portion of the metal plates so as not to penetrate in the lamination direction, and a portion suspended in the seal target hole is formed at the thermal deformation coping portion when one seal target hole is provided, and at least one of portions interposed between the adjacent seal portions and a portion interposed between the adjacent bolt holes is formed at the thermal deformation coping portion when a plurality of seal target holes is provided.

According to the present invention, since a portion in which a change in expansion or contraction of the metal plate due to the thermal expansion or thermal contraction is relatively large is set as the thermal deformation coping portion and all metal plates constituting the thermal deformation coping portion are provided with the slits intersecting the longitudinal direction thereof, it is possible to absorb the expansion and contraction of the metal plate due to the thermal expansion or thermal contraction by the slits. Accordingly, since it is advantageous to decrease a compressive force generated by the thermal expansion or a tensile force generated by the thermal contraction, it is possible to effectively prevent damage of the gasket due to a change in temperature. Further, in addition to the above-described effect, according to the present invention, since the slits of the laminated metal plates are separated from each other in the longitudinal direction of the thermal deformation coping portion and the slits are formed so as not to penetrate in the lamination direction, it is possible to prevent an unnecessary penetration portion from being formed at the thermal deformation coping portion. Accordingly, it is advantageous to prevent a deterioration in sealing performance in the lamination direction of the thermal deformation coping portion generated when the slits are provided.

DETAILED DESCRIPTION

Figure 1:
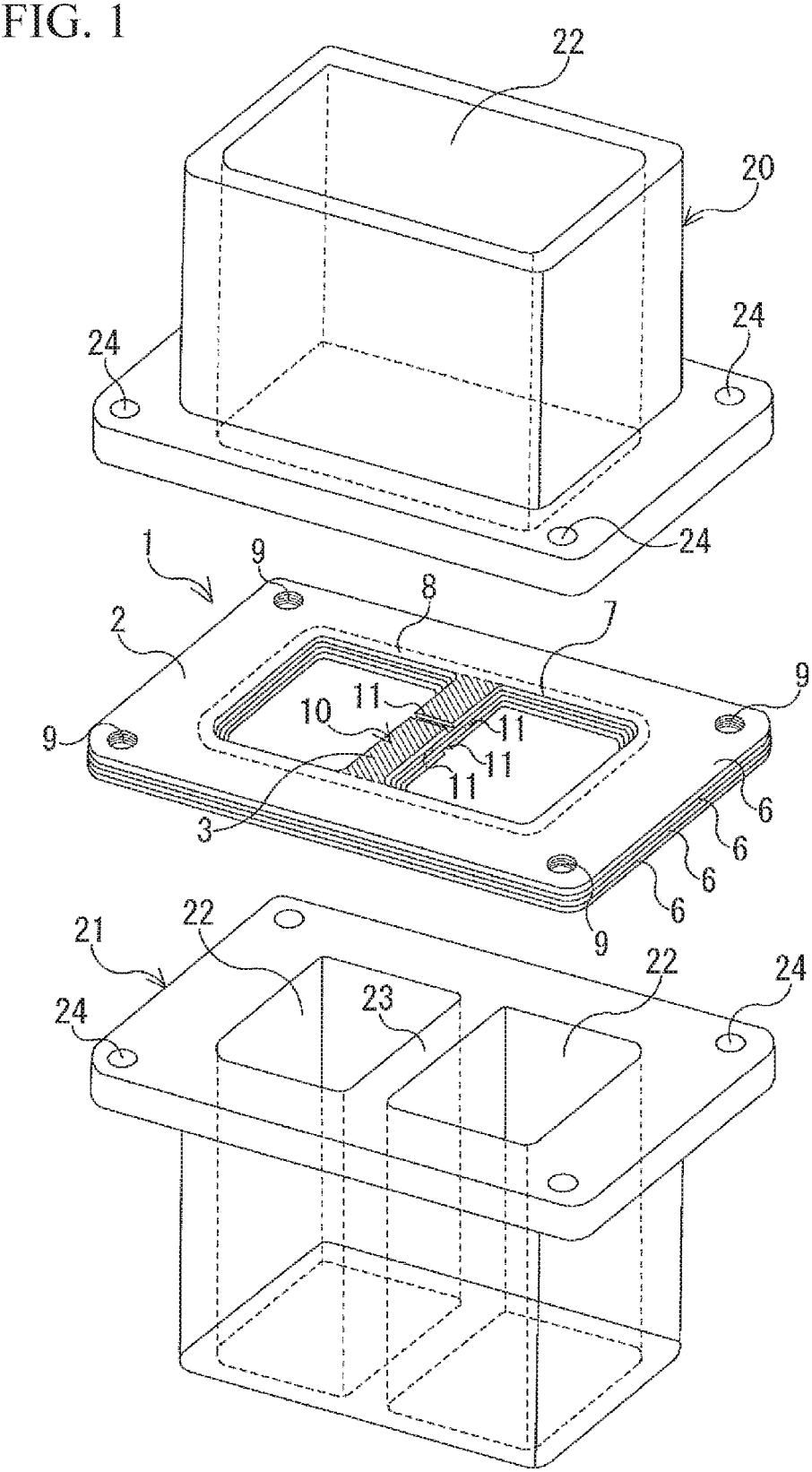
FIG. 1 is a perspective view illustrating a first embodiment of a gasket of the present invention.

Hereinafter, a gasket according to an embodiment of the present invention will be described with reference to the drawings. In FIGS. 1 to 8, dimensions are changed in order to easily understand configurations and a size of a seal target hole or a bolt hole or a dimension such as a thickness and a shape of a metal plate constituting a gasket are not necessarily to scale with actually manufactured products.

A gasket 1 of a first embodiment according to the present invention illustrated in FIGS. 1 to 4 is used while being interposed between a pipe body 20 and a pipe body 21 having different number of ventilation holes 22. More specifically, the gasket 1 is used for a connection portion of an exhaust system or a connection portion between an exhaust manifold and a turbocharger and seals an exhaust gas passing through the pipe bodies 20 and 21 while being interposed between the pipe body 20 and the pipe body 21.

As illustrated in FIG. 1, in a joint structure for connecting the pipe bodies 20 and 21 having different number of ventilation holes 22, a structure is obtained in which a partition portion 23 is provided in the pipe body 21 having a relatively large number of ventilation holes 22 to divide the ventilation holes 22 of the pipe body 20 having a relatively small number of ventilation holes 22. In the embodiment, the gasket 1 which is used while being interposed between the pipe body 20 having one ventilation hole 22 and the pipe body 21 having two ventilation holes 22 is exemplified. Each of the pipe body 20 and the pipe body 21 includes the same rectangular flange portion and each flange portion is provided with four bolt holes 24 through which fastening bolts are inserted.

The gasket 1 is formed by laminating four metal plates 6. As the metal plate 6, for example, a mild steel plate, a stainless steel annealed material (annealed material), a stainless steel tempering material (spring steel plate), or the like is used. The gasket 1 includes an outer peripheral portion 2 which is in contact with both end surfaces of the pipe body 20 and the pipe body 21 while being interposed between two pipe bodies 20 and 21 and a partition protector 3 which coats only the end surface of the partition portion 23 of the pipe body 21 while not contacting the end surface of the pipe body 20.

Figure 2:
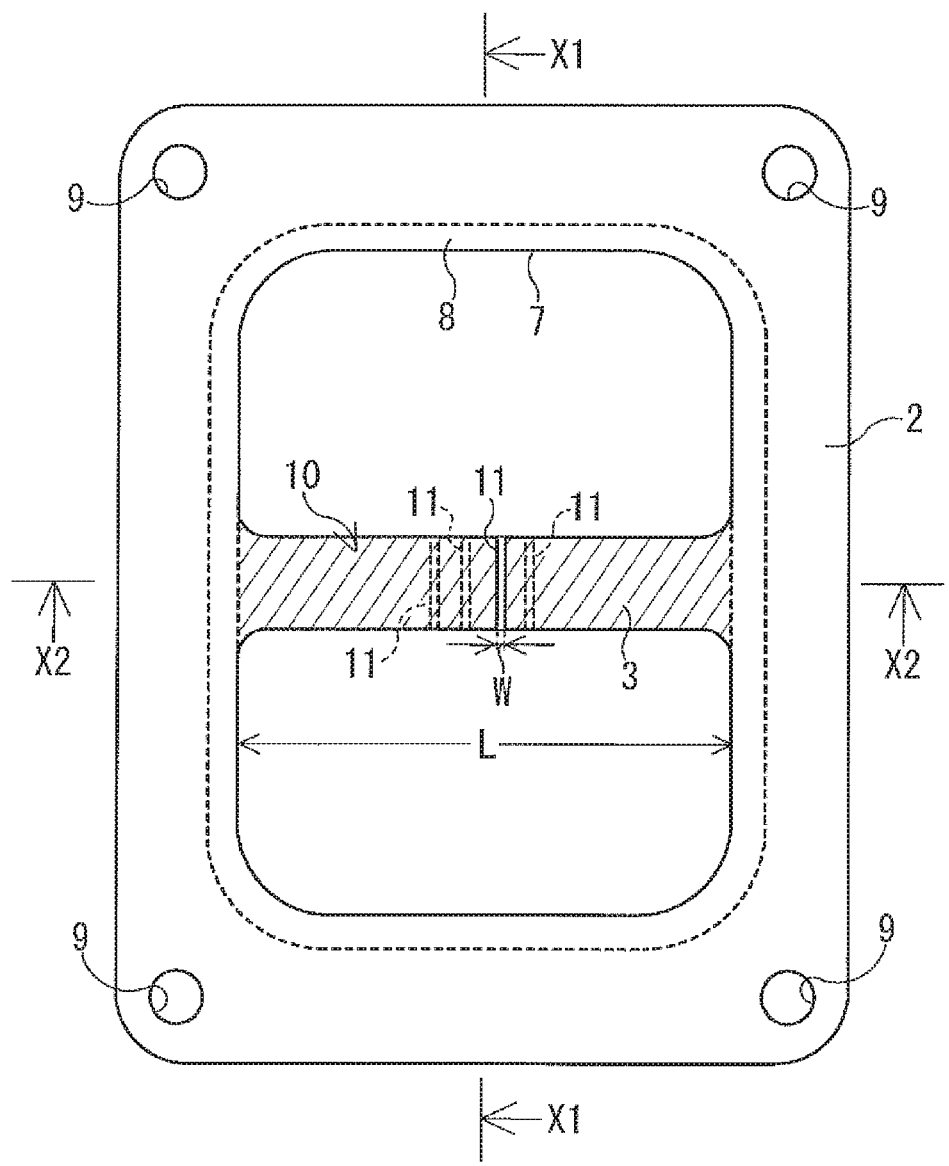
FIG. 2 is a plan view illustrating the gasket of FIG. 1.

As illustrated in FIG. 2, the outer shape of the outer peripheral portion 2 is formed in a rectangular shape which is the same as the outer shapes of the flange portions of the pipe bodies 20 and 21. The outer peripheral portion 2 includes one seal target hole 7 which penetrates the metal plate 6 in the lamination direction, an annular seal portion 8 which seals the outer peripheral edge of the seal target hole 7, and four bolt holes 9 which are disposed at the outer peripheral side of the seal portion 8 and through which fastening bolts are inserted.

The seal target hole 7 is formed in a square shape corresponding to the ventilation hole 22 of the pipe body 20 and the belt-shaped partition protector 3 is provided to be suspended in the center of the seal target hole 7. As the seal portion 8, a structure in which a bead is formed by protruding or depressing the metal plate 6 in the lamination direction, a structure in which a shim is provided by a separate metal plate, a structure in which an end portion of the metal plate 6 is covered by a fold-back portion obtained by folding back an end portion of the other metal plate 6, and a structure in which a grommet is fitted can be exemplified.

When the pipe body 20 and the pipe body 21 are directly connected to each other, the end surface of the partition portion 23 is exposed while not contacting the pipe body 20. For this reason, a high-temperature fluid such as an exhaust gas passing through the pipe body 20 directly hits the end surface of the partition portion 23 of the pipe body 21. For that reason, when the pipe body 21 is formed of a metal such as aluminum having a low melting point, there is a concern that the temperature of the end surface of the partition portion 23 rises and the end surface is melted. Here, the gasket 1 is used in order to secure the sealing performance at the joint portion having different number of ventilation holes 22 and to prevent the melting of the end surface of the partition portion 23.

Figure 3:
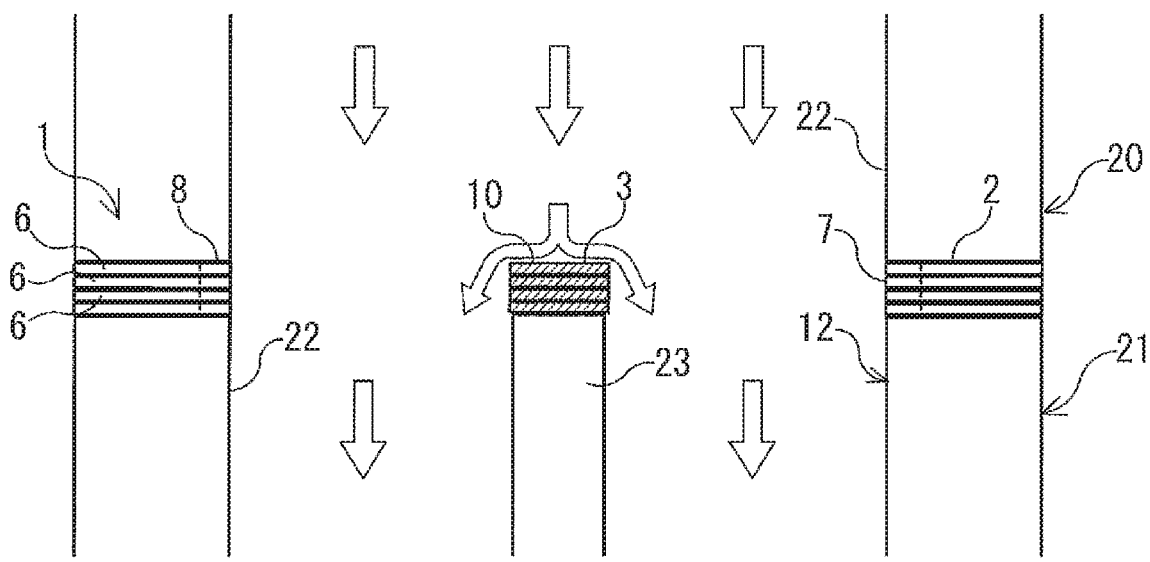
FIG. 3 is a cross-sectional view as viewed from an arrow X1-X1 of FIG. 2.

As illustrated in FIG. 3, when the gasket 1 is used while being interposed between the pipe body 20 and the pipe body 21, the high-temperature exhaust gas passing through the seal target hole 7 of the pipe body 20 directly hits the partition protector 3 which is coated and protects the end surface of the partition portion 23. Therefore, in the gasket 1 of the embodiment, since the partition protector 3 becomes a portion in which a change in expansion or contraction of the metal plate 6 due to the thermal expansion or thermal contraction is relatively large, the partition protector is formed by a thermal deformation coping portion 10 (a shaded portion in FIGS. 1 to 4) of the present invention. The outline arrows of FIGS. 3 and 4 indicate the flow of the exhaust gas.

As illustrated in FIG. 2, in the gasket 1 of the present invention, a slit 11 intersecting the longitudinal direction of the thermal deformation coping portion 10 is provided in all metal plates 6 forming the thermal deformation coping portion 10 and these slits 11 constitute a lamination portion of the metal plates 6 so as not to penetrate in the lamination direction. The longitudinal direction of the thermal deformation coping portion 10 of the gasket 1 is a direction in which the partition protector 3 extends to traverse the seal target hole 7.

In the embodiment, each slit 11 of the thermal deformation coping portion 10 is formed to cross the partition protector 3. In the embodiment, the linear slit 11 is formed, but the shape of the slit 11 is not particularly limited. In addition, the slit 11 may be formed in, for example, a curved or serrated shape. Each slit 11 is disposed at the center portion of the thermal deformation coping portion 10 in the longitudinal direction and is formed so as not to overlap the slit 11 of the adjacent metal plate 6. The center portion of the thermal deformation coping portion 10 in the longitudinal direction is, for example, a center region when the length L of the thermal deformation coping portion 10 in the longitudinal direction is divided into three parts.

The slit width W of each slit 11 of the thermal deformation coping portion 10 in the longitudinal direction is set, for example, based on a linear expansion coefficient (a thermal expansion coefficient) $\alpha$ of the metal plate 6 constituting the thermal deformation coping portion 10, a temperature difference $\Delta T$ of the thermal deformation coping portion 10 when the gasket 1 is used, and a length L of the thermal deformation coping portion 10 in the longitudinal direction. More specifically, since an expansion/contraction change amount of the metal plate 6 due to thermal expansion or thermal contraction is proportional to each of the temperature difference $\Delta T$ and the length L, the slit width W is set based on the product of the linear expansion coefficient $\alpha$, the temperature difference $\Delta T$, and the length L. The temperature difference $\Delta T$ is a temperature difference between a high temperature and a low temperature of the thermal deformation coping portion 10 assumed at the time of using the gasket 1, and the length L is, in the embodiment, a length of the partition protector 3 in the longitudinal direction. Accordingly, both slits 11 of the metal plates 6 constituting the thermal deformation coping portion 10 are set not to contact each other at the time of using the gasket 1.

In the embodiment, all slits 11 formed in the metal plates 6 of respective layers are set to have the same slit width W, but when the linear expansion coefficient $\alpha$ of the metal plate 6 constituting each layer, the temperature difference $\Delta T$ in a usage state, or the length L of the thermal deformation portion 10 in the longitudinal direction is different, all slits 11 forming in the metal plates 6 of respective layers may be set to have different slit widths W.

Figure 4:
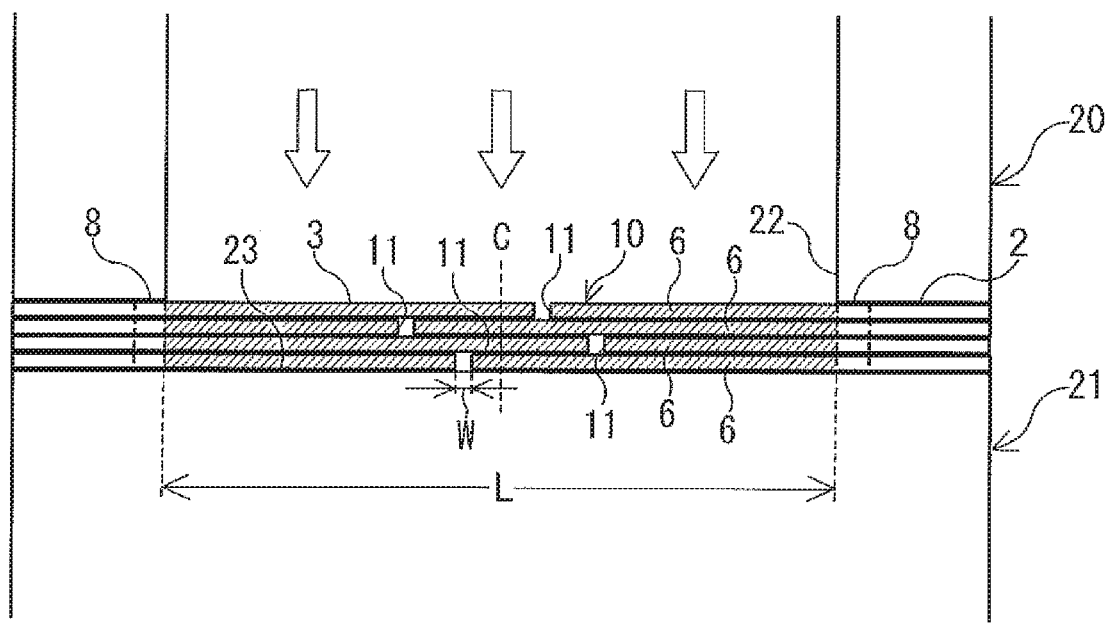
FIG. 4 is a cross-sectional view as viewed from an arrow X2-X2 of FIG. 2.

As illustrated in FIG. 4, in the embodiment, the slits 11 of the metal plates 6 which are adjacent to each other in the lamination direction are respectively disposed at positions separated from each other in the longitudinal direction of the thermal deformation coping portion 10. A distance between the slits 11 adjacent to each other in the lamination direction is set so that the slits 11 adjacent to each other in the lamination direction at the time of using the gasket 1 do not overlap each other. Further, the slits 11 are disposed so that the slits 11 adjacent to each other in the lamination direction are respectively located at different sides with the center position C of the thermal deformation coping portion 10 in the longitudinal direction as a boundary. In other words, the slits 11 which are adjacent to each other in the lamination direction are disposed to be staggered with the center position C as a boundary.

The slit 11 can be formed by, for example, a press die which is common to a press die for forming the seal target hole 7 or the bolt hole 9 in the metal plate 6. Then, the gasket 1 can be manufactured by laminating the metal plates 6 respectively forming the slits 11.

As described above, in the gasket 1 of the present invention, a portion in which a change in expansion or contraction of the metal plate 6 due to the thermal expansion or thermal contraction is relatively large is formed by the thermal deformation coping portion 10 and all metal plates 6 forming the thermal deformation coping portion 10 are provided with the slits 11 intersecting the longitudinal direction of the thermal deformation coping portion 10, thereby absorbing the expansion or contraction of the metal plate 6 due to the thermal expansion or thermal contraction by the slits 11. Accordingly, since it is advantageous to decrease a compressive force generated by the thermal expansion or a tensile force generated by the thermal contraction, it is possible to effectively prevent the damage of the gasket 1 due to a change in temperature.

Further, since the slits 11 of the laminated metal plates 6 are separated from each other in the longitudinal direction of the thermal deformation coping portion 10 so that the slits 11 of the adjacent metal plates 6 do not overlap each other and the slits 11 do not penetrate in the lamination direction, it is possible to prevent an unnecessary penetration portion from being formed at the thermal deformation coping portion 10. Accordingly, it is advantageous to prevent a deterioration in sealing performance in the lamination direction of the thermal deformation coping portion 10 generated when the slit 11 is provided.

Accordingly, as in the embodiment, in the case of the gasket 1 having the partition protector 3, since the partition protector 3 is provided with the thermal deformation coping portion 10, it is possible to keep a high thermal barrier effect of the partition protector 3 while absorbing the expansion or contraction of the metal plate 6 due to the thermal expansion or thermal contraction by the slit 11 formed at the thermal deformation coping portion 10. That is, it is possible to effectively prevent the melting of the end surface of the partition portion 23 by the partition protector 3 while effectively preventing damage due to a change in temperature of the gasket 1.

As in the embodiment, when the slits 11 of the metal plates 6 adjacent to each other in the lamination direction are disposed to be separated from each other in the longitudinal direction of the thermal deformation coping portion 10, the slits 11 which are adjacent to each other in the lamination direction do not easily overlap each other. Accordingly, since heat generated by a high-temperature fluid is not easily transferred in the lamination direction through the slit 11, it is advantageous to improve a thermal barrier effect of the thermal deformation coping portion 10. When a distance between the slits 11 adjacent to each other in the lamination direction is set so that the slits 11 adjacent to each other in the lamination direction do not overlap each other at the time of using the gasket 1, it is more advantageous to improve the thermal barrier effect of the thermal deformation coping portion 10.

When the slit 11 is formed to cross the thermal deformation coping portion 10, it is possible to more effectively absorb the expansion or contraction of the metal plate 6 due to the thermal expansion or thermal contraction in the thermal deformation coping portion 10 by the slit 11. For that reason, it is advantageous to prevent the damage due to the thermal expansion or thermal contraction of the gasket 1.

Further, when the slit 11 is formed at the center portion of the thermal deformation coping portion 10 in the longitudinal direction, the metal plates 6 at both sides with the slit 11 as a boundary in the thermal deformation coping portion 10 in the longitudinal direction can have the substantially same length. Accordingly, a change amount of the thermal expansion or thermal contraction of the metal plates 6 at both sides with the slit 11 as a boundary can be set to be substantially the same. Accordingly, even when the metal plate 6 is distorted due to the thermal deformation, the deformation can be made uniform. Therefore, it is advantageous to prevent the damage due to the thermal expansion or thermal contraction of the gasket 1. Further, in the embodiment, since a force applied to a joint between the partition protector 3 and the main body portion 2 can be made substantially the same on the left and right side, it is advantageous to prevent the deformation or damage of the partition protector 3.

Further, when the slits 11 which are adjacent to each other in the lamination direction are respectively disposed at different sides with the center position C of the thermal deformation coping portion 10 in the longitudinal direction as a boundary, it is possible to secure a sufficiently large gap between the slits 11 which are adjacent to each other in the lamination direction while disposing the slits 11 at the center portion of the thermal deformation coping portion 10 in the longitudinal direction. Accordingly, since an exhaust gas does not easily pass through the slit 11 in the lamination direction, it is advantageous to prevent the melting of the end surface of the partition portion 23 by the partition protector 3.

As in the embodiment, when the thermal deformation coping portion 10 is provided at the partition protector 3 suspended at the seal target hole 7, the slit width W of the slit 11 formed at the thermal deformation coping portion 10 may be set to a minimum size in which both slits 11 do not contact each other at the time of using the gasket 1. When the slit width W is set to a minimum size at which both slits 11 do not contact each other at the time of using the gasket 1, heat of a high-pressure fluid is not easily transferred in the lamination direction through the slit 11. Accordingly, it is advantageous to improve the thermal barrier effect of the partition protector 3.

Additionally, in the embodiment, the gasket 1 which is used while being interposed between the pipe body 20 having one ventilation hole 22 and the pipe body 21 having two ventilation holes 22 has been exemplified, but the present invention is not limited to the number, arrangement, or shape of the partition protector 3. In addition, various configuration can be used. For example, in the case of the gasket 1 used while being interposed between the pipe body having one ventilation hole 22 and the pipe body having three ventilation holes 22, the partition protector 3 may be provided at a plurality of positions.

The number of the laminated metal plates 6, the plate thickness or material of each metal plate 6, the existence of the bead, or the like is not particularly limited and can be appropriately determined in response to the joint structure to be used. In the embodiment, the thermal deformation coping portion 10 is provided so that the slit 11 is formed only at the partition protector 3, but, for example, a gap between the adjacent bolt holes 9 in the outer peripheral portion of the main body portion 2 may be formed as the thermal deformation coping portion 10.

Figure 5:
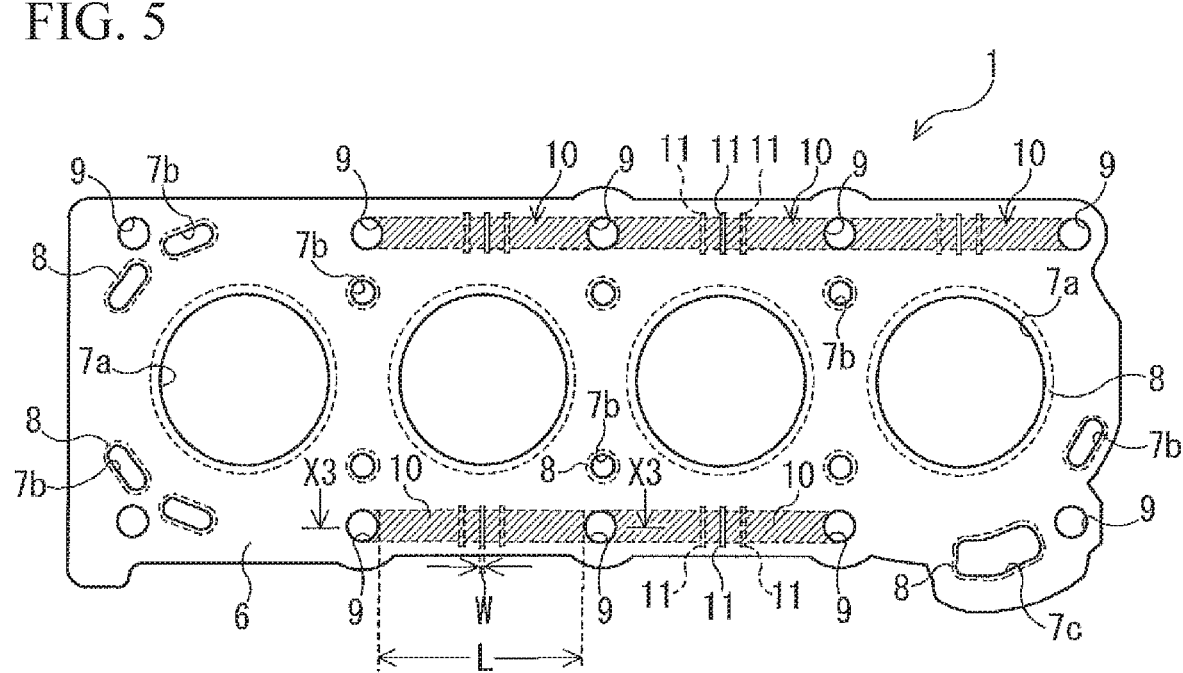
FIG. 5 is a plan view illustrating a second embodiment of the gasket of the present invention.
Figure 6:
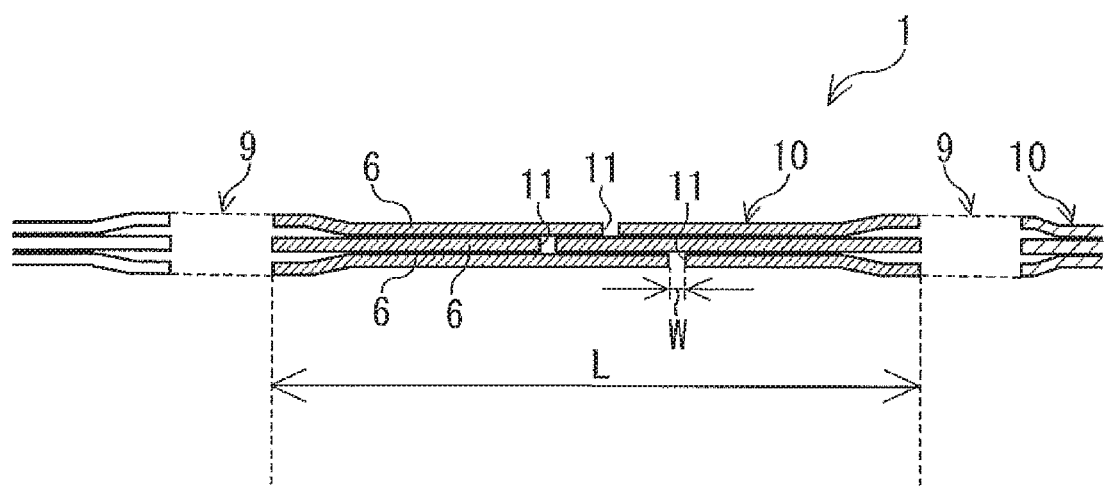
FIG. 6 is a cross-sectional view as viewed from an arrow X3-X3 of FIG. 5.

FIGS. 5 and 6 illustrate a gasket 1 of a second embodiment according to the present invention. The gasket 1 of the embodiment is used as a head gasket which is used while being interposed between the cylinder block and the cylinder head of the internal-combustion engine.

The gasket 1 is formed by laminating three metal plates 6. As illustrated in FIG. 5, the gasket 1 is provided with four bore holes 7a corresponding to the seal target hole 7. Each bore hole 7a is provided with an annular seal portion 8 which seals an outer peripheral edge. Ten bolt holes 9 which fasten the cylinder block and the cylinder head to each other are formed at the outer peripheral side of the seal portion 8. A portion between the bore hole 7a and the bolt hole 9 or a portion between the bolt hole 9 and the bolt hole 9 is provided with a plurality of water holes 7b and oil holes 7c corresponding to the seal target hole 7. The seal portion 8 is provided at each of the outer peripheral edges of the water hole 7b and the oil hole 7c.

In the gasket 1, since cooling water for preventing an increase in temperature of an engine flows in the water hole 7b, a portion close to the water hole 7b in the gasket 1 is cooled to a certain degree. For that reason, a portion close to the water hole 7b of the gasket 1 becomes a portion in which a change in expansion or contraction of the metal plate 6 due to the thermal expansion or thermal contraction is relatively small. Further, since a distance between the bore holes 7a is relatively short, a portion between the bore holes 7a also becomes a portion in which a change in expansion or contraction of the metal plate 6 due to the thermal expansion or thermal contraction is relatively small.

Meanwhile, since a portion between the bolt holes 9 which are adjacent to each other without interposing the water hole 7b therebetween is relatively distant from the water hole 7b, a temperature thereof is relatively higher than that of the other portion. Therefore, in the gasket 1, a portion in which a change in expansion or contraction of the metal plate 6 due to the thermal expansion or thermal contraction is large becomes a portion (a shaded portion in FIGS. 5 and 6) interposed between the adjacent bolt holes 9 and this portion is formed as the thermal deformation coping portion 10. Additionally, a portion which is interposed between the adjacent bolt holes 9 is, specifically, a portion surrounded by the common external tangent of the two bolt holes 9 and the outer edges of the bolt holes 9.

In the gasket 1, the slits 11 intersecting the longitudinal direction of the thermal deformation coping portion 10 are provided in all metal plates 6 constituting the thermal deformation coping portion 10 interposed between the adjacent bolt holes 9. Then, these slits 11 constitute the lamination portion of the metal plates 6 which do not penetrate in the lamination direction. As illustrated in FIG. 6, the slits 11 of the metal plates 6 which are adjacent to each other in the lamination direction are disposed to be separated from each other in the longitudinal direction of the thermal deformation coping portion 10. The longitudinal direction of the thermal deformation coping portion 10 of the embodiment indicates the axial direction in which the center of the bolt hole 9 is connected to the center of the bolt hole 9.

In the embodiment, the rectangular slit 11 is formed, but the shape of the slit 11 is not particularly limited. In addition, for example, the slit 11 may be formed in a rounded rectangular or elliptical shape. A position in which the slit 11 is formed may be set to a position in which a bead or shim is not provided in consideration of the surface pressure or sealing performance of the gasket 1.

Each slit 11 is formed to cross the thermal deformation coping portion 10. That is, the slit 11 is formed to intersect both of two common external tangents of two bolt holes 9. Further, in the embodiment, each slit 11 is formed to be orthogonal to the longitudinal direction of the thermal deformation coping portion 10. Further, each slit 11 is disposed at the center portion of the thermal deformation coping portion 10 in the longitudinal direction.

As in the embodiment, in the gasket 1 used as the head gasket, an expansion/contraction change amount of the metal plate due to the thermal expansion or thermal contraction increases in a portion interposed between the adjacent bolt holes 9. For that reason, since a portion interposed between the adjacent bolt holes 9 is formed as the thermal deformation coping portion 10 provided with the slit 11, it is possible to effectively decrease a compressive force generated by the thermal expansion or a tensile force generated by the thermal contraction in the gasket 1. Accordingly, since the distortion of the gasket 1 is prevented, it is advantageous to keep the high sealing performance.

A direction in which the metal plate 6 largely expands or contracts due to a change in temperature becomes the longitudinal direction of the thermal deformation coping portion 10. Therefore, as in the embodiment, when the slit 11 is formed to be orthogonal to the longitudinal direction of the thermal deformation coping portion 10, it is possible to absorb the expansion or contraction of the metal plate 6 of the thermal deformation coping portion 10 in the longitudinal direction of the thermal deformation portion 10. Accordingly, since the metal plate 6 is easily distorted, it is advantageous to prevent the damage due to the thermal expansion or thermal contraction of the gasket 1.

Additionally, in the embodiment, the gasket 1 which is used as the head gasket of the in-line four-cylinder engine has been exemplified, but the number, arrangement, or shape of the bore hole 7a, the water hole 7b, the oil hole 7c, or the bolt hole 9 is not limited to the embodiment and can be set variously. Further, the number of the laminated metal plates 6, the plate thickness or material of each metal plate 6, or the existence of the bead is not particularly limited and can be appropriately determined in response to the type of engine to be used.

Figure 7:
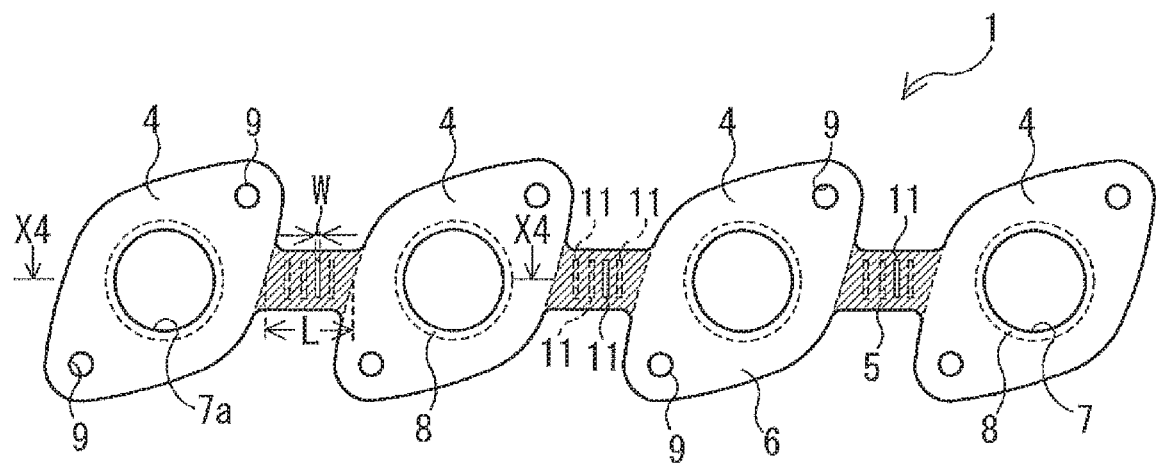
FIG. 7 is a plan view illustrating a third embodiment of the gasket of the present invention.
Figure 8:
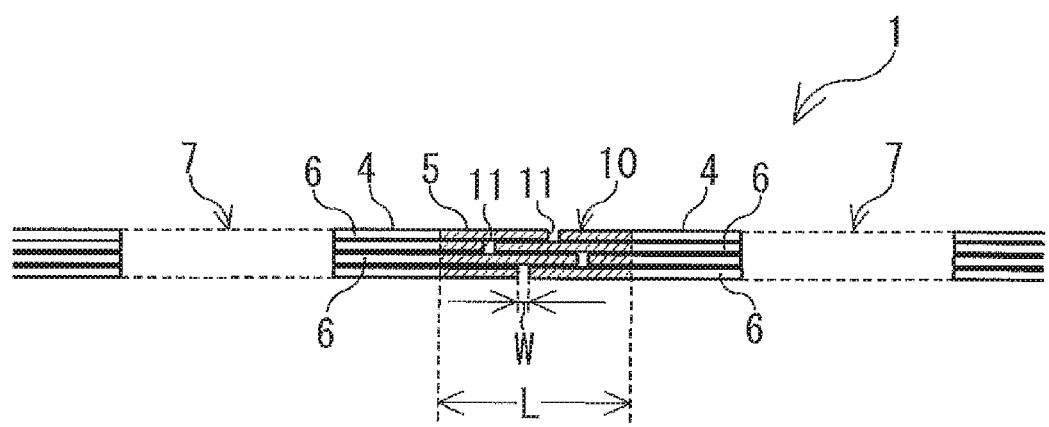
FIG. 8 is a cross-sectional view as viewed from an arrow X4-X4 of FIG. 7.

FIGS. 7 and 8 illustrate a gasket 1 of a third embodiment according to the present invention. The gasket 1 of the embodiment is used as a manifold gasket while being interposed between the cylinder head and the exhaust manifold of the internal-combustion engine.

The gasket 1 is formed by laminating four metal plates 6. As illustrated in FIG. 7, the gasket 1 includes a plurality of main body portions 4 which seal the exhaust ports and a connection portion 5 which connects the adjacent main body portions 4.

Each main body portion 4 includes one seal target hole 7 and a seal portion 8 which seals the outer peripheral edge of the seal target hole 7. Two bolt holes 9 for fastening the cylinder head and the exhaust manifold to each other are formed at the outer peripheral side of the seal portion 8 of the main body portion 4. The gasket 1 includes four main body portion 4 and three belt-shaped connection portions 5 which connect the adjacent main body portions 4. The number or shape of each of the main body portion 2 and the connection portion 5 or the number or arrangement of the bolt hole 9 is not limited to the embodiment and can be set variously.

In the gasket 1 which is used as the manifold gasket, the connection portion 5 which is interposed between the adjacent seal portions 8 becomes a portion in which a change in expansion or contraction of the metal plate 6 due to the thermal expansion or thermal contraction is relatively large and this portion is provided with the thermal deformation coping portion 10 (a shaded portion in FIGS. 7 and 8). In the gasket 1, the rectangular slits 11 intersecting the longitudinal direction of the thermal deformation coping portion 10 are provided in all metal plates 6 constituting the thermal deformation coping portion 10 of the connection portion 5. Then, these slits 11 constitute the lamination portion of the metal plates 6 which do not penetrate in the lamination direction. As illustrated in FIG. 8, the slits 11 of the metal plates 6 which are adjacent in the lamination direction are disposed to be separated from each other in the longitudinal direction of the thermal deformation coping portion 10. The longitudinal direction of the thermal deformation coping portion 10 of the embodiment is a direction in which the connection portion 5 extends to connect the main body portions 4.

In the gasket 1, each slit 11 is disposed at the center portion in the longitudinal direction of the connection portion 5 corresponding to the thermal deformation coping portion 10 and each slit 11 is formed at the inside of the thermal deformation coping portion 10 so as not to cut the connection portion 5.

As in the embodiment, in the case of the gasket 1 which is used as the manifold gasket, since the connection portion 5 is formed by the thermal deformation coping portion 10 provided with the slit 11, it is possible to absorb the expansion or contraction of the metal plate 6 due to the thermal expansion or thermal contraction in the connection portion 5 by the slit 11. Accordingly, since it is advantageous to decrease a compressive force generated by the thermal expansion or a tensile force generated by the thermal contraction, it is possible to effectively prevent the damage of the gasket 1 due to a change in temperature.

Further, since the slits 11 of the laminated metal plates 6 are separated from each other in the longitudinal direction of the thermal deformation coping portion 10 and these slits 11 are not formed to penetrate in the lamination direction, it is possible to prevent an unnecessary penetration portion from being formed in the connection portion 5 corresponding to the thermal deformation coping portion 10. Accordingly, it is advantageous to keep the strength of the connection portion 5.

Additionally, the configuration of the gasket 1 of the present invention is not limited to the above-described embodiment as long as the gasket is formed by laminating two or more metal plates 6 and can be also applied to the gaskets used for various purposes. Further, in the present invention, the thermal deformation coping portion 10 provided with the slit 11 can be formed in all portions which are thermally deformed due to the thermal expansion or thermal contraction in the gasket 1 and the thermal deformation coping portion 10 can be provided only in a portion in which a thermal deformation due to the thermal expansion or thermal contraction is particularly noticeable instead of all portions.

For example, as in the second embodiment which is exemplified above, in the case of the gasket 1 used as the head gasket, a portion located at the intake side of the engine and a portion located at the exhaust side thereof are provided, but in the gasket 1, a change in temperature in the portion located at the exhaust side is larger than that of the portion located at the intake side. Therefore, it is possible to provide the thermal deformation coping portion 10 in which the slit 11 is formed only at the portion located at the exhaust side.

REFERENCE SIGNS LIST 1 gasket
2 outer peripheral portion
3 partition protector
4 main body portion
5 connection portion
6 metal plate
7 seal target hole
7a bore hole
7b water hole
7c oil hole
8 seal portion
9 bolt hole
10 thermal deformation coping portion
11 slit
20, 21 pipe body
22 ventilation hole
23 partition portion
24 bolt hole

What is claimed is:

1. A gasket for sealing a joint between a pipe body with one hole and a pipe body with two holes, the gasket comprising:
   two or more metal plates laminated together;
   two or more seal target holes penetrating in a lamination direction;
   an annular seal portion sealing an outer peripheral edge surrounding both seal target holes;
   a plurality of bolt holes disposed at an outer peripheral side of the seal portion so that fastening bolts are inserted therethrough; and
   a partition protector including a thermal deformation coping portion, located in the two or more seal target holes
   wherein the thermal deformation coping portion comprises an offset slit in each metal plate such that none of the slits are aligned in the lamination direction, and such that the slits prevent damage to the gasket due to temperature fluctuations by accommodating thermal expansion or contraction of the gasket.

2. The gasket according to claim 1, wherein the offset slit in each metal plate is formed at a center portion of the thermal deformation coping portion in the longitudinal direction.

3. The gasket according to claim 1, wherein the offset slit in each metal plate crosses the thermal deformation coping portion.

4. The gasket according to claim 1, wherein two sides of the offset slit in each metal plate constituting the thermal deformation coping portion are set not to contact each other at a time of using the gasket.

* * * * *